(12) United States Patent
Zhang

(10) Patent No.: US 8,904,662 B2
(45) Date of Patent: Dec. 9, 2014

(54) TEST DEVICE FOR COAXIAL ACCURACY

(75) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 289 days.

(21) Appl. No.: 13/596,068

(22) Filed: Aug. 28, 2012

(65) Prior Publication Data

US 2014/0041243 A1 Feb. 13, 2014

(30) Foreign Application Priority Data

Aug. 13, 2012 (CN) .......................... 2012 1 0286155 7

(51) Int. Cl.
*G01B 5/25* (2006.01)

(52) U.S. Cl.
USPC .............................................. 33/645; 33/533

(58) Field of Classification Search
USPC .................................... 33/645, 613, 533, 655
See application file for complete search history.

(56) References Cited

U.S. PATENT DOCUMENTS

| | | | | |
|---|---|---|---|---|
| 4,993,168 A * | 2/1991 | Acuna | ............................. | 33/666 |
| 7,458,143 B2 * | 12/2008 | Wiseman et al. | ............... | 33/645 |
| 7,827,702 B1 * | 11/2010 | Zhang | ............................. | 33/613 |
| 7,963,045 B2 * | 6/2011 | Zhang | ........................ | 33/501.06 |
| 8,146,262 B1 * | 4/2012 | Suarez et al. | .................... | 33/644 |
| 8,387,267 B1 * | 3/2013 | Ruhoff | ............................. | 33/644 |
| 8,453,491 B2 * | 6/2013 | Yu et al. | .......................... | 33/613 |
| 8,458,920 B2 * | 6/2013 | Suarez et al. | .................... | 33/644 |
| 8,468,706 B2 * | 6/2013 | Zhang | ............................. | 33/520 |
| 8,578,622 B2 * | 11/2013 | Sahm | ............................. | 33/645 |
| 2010/0293803 A1 * | 11/2010 | Zhang | ............................. | 33/810 |
| 2010/0299951 A1 * | 12/2010 | Zhang | ............................. | 33/812 |
| 2012/0266477 A1 * | 10/2012 | Zhang | ............................. | 33/674 |
| 2014/0041243 A1 * | 2/2014 | Zhang | ............................. | 33/533 |

* cited by examiner

*Primary Examiner* — Yaritza Guadalupe-McCall
(74) *Attorney, Agent, or Firm* — Novak Druce Connolly Bove + Quigg LLP

(57) ABSTRACT

A test device for testing whether a coaxial accuracy between a test hole and a standard hole of an object is qualified or not includes a base to support the object, a fixing member to fix the object, and a positioning member and a testing member respectively mounted to a bottom and a top of the base. The positioning member includes a positioning pole to be inserted into a standard hole of the object. The testing member includes a testing pole slidably relative to and aligning with the positioning pole. A diameter of the testing pole is set to be equal to a standard diameter of a test hole subtracting a coaxial tolerance of the test hole. If the testing pole is capable of being inserted into the test hole, the coaxial accuracy between the test and standard holes of the object is qualified.

13 Claims, 5 Drawing Sheets

TEST DEVICE FOR COAXIAL ACCURACY

BACKGROUND

1. Technical Field

The present disclosure relates to a device for testing a coaxial accuracy of two holes of an object.

2. Description of Related Art

Generally, to test coaxial accuracy of two holes of an object, the object needs to be taken to a testing room away from the product line and is tested by projective measurements or three dimensional testing devices, which is time consuming.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
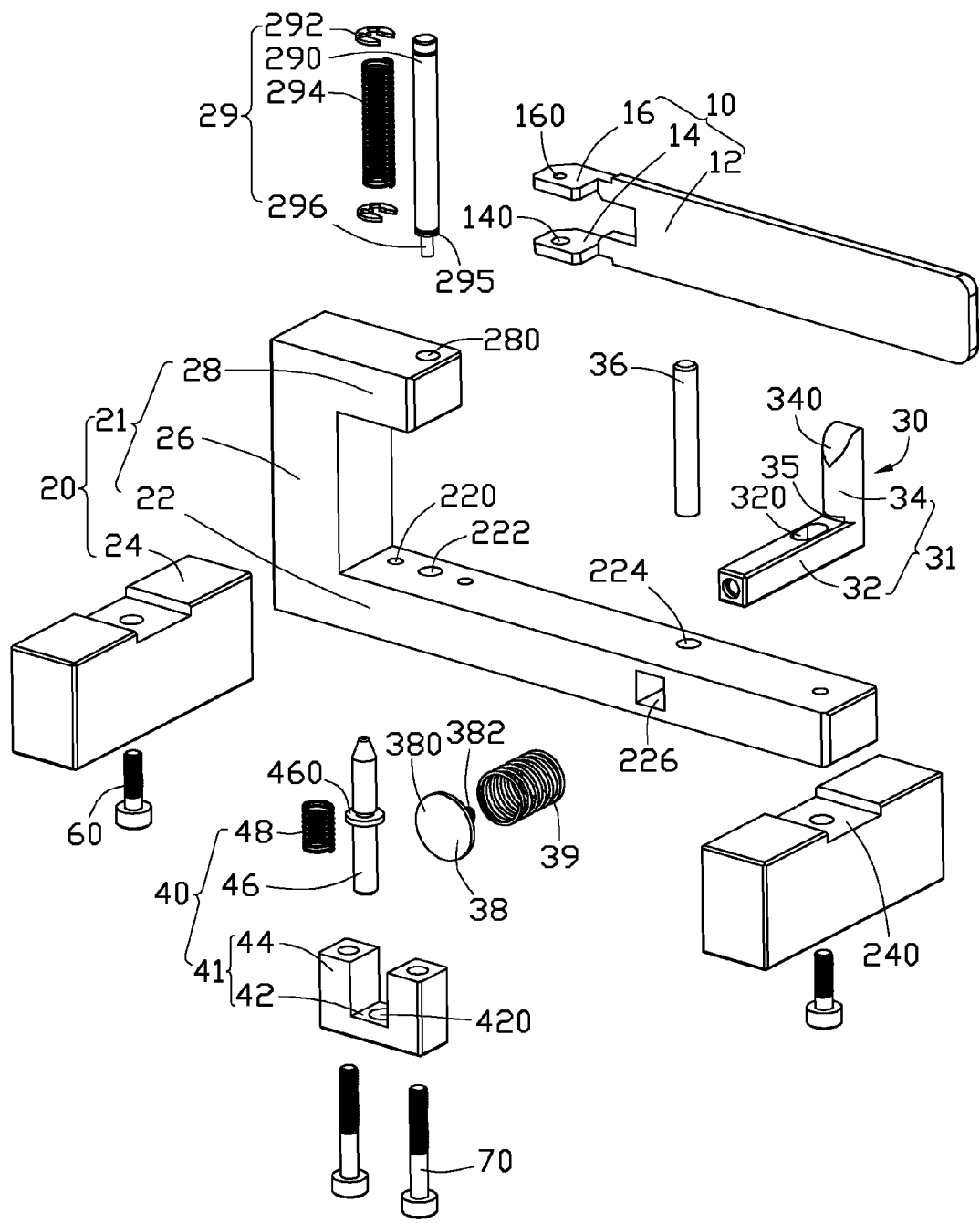
FIG. 1 is an exploded, isometric view of an exemplary embodiment of a test device, together with an object to be tested.
Figure 2:
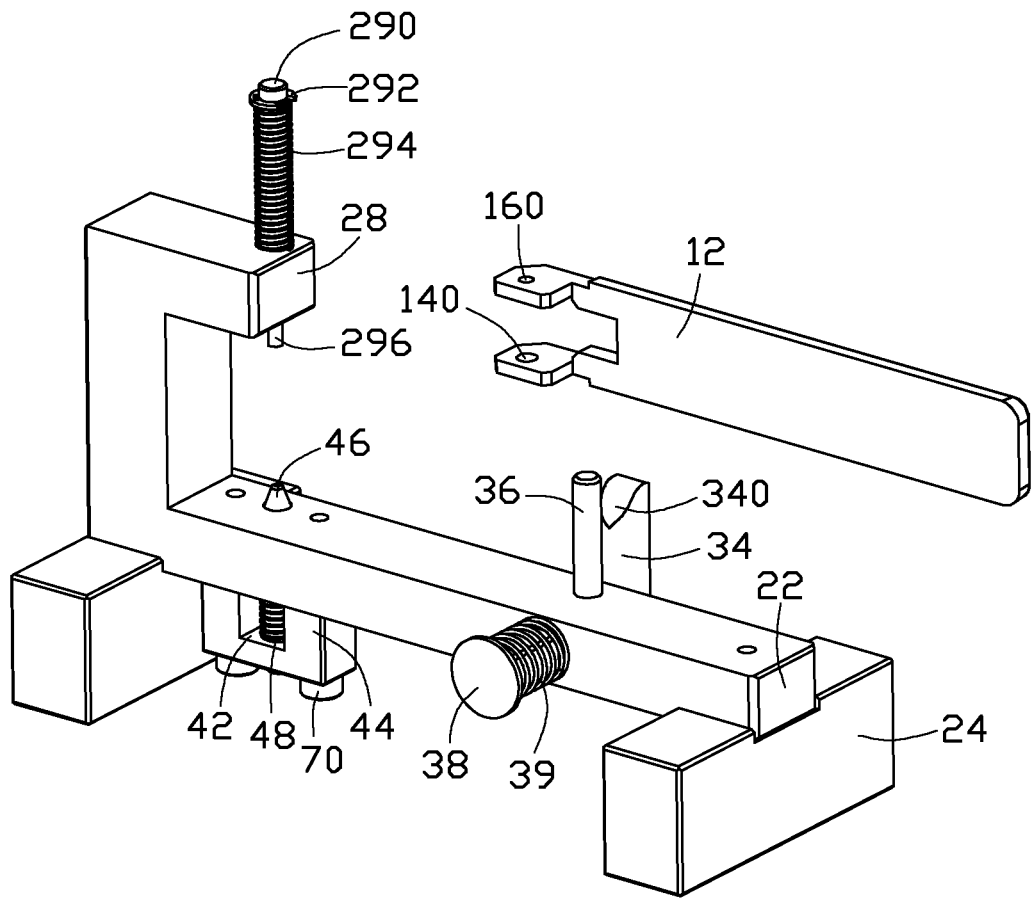
FIG. 2 is a partly assembled, isometric view of the test device and the object of FIG. 1.

Referring to FIGS. 1 and 2, an exemplary embodiment of a test device is provided for testing a coaxial accuracy between two holes of an object 10 is qualified or not. The test device includes a base 20, a testing member 29, a fixing member 30, and a positioning member 40.

The object 10 includes a rectangular main body 12, and a standard piece 14 and a test piece 16 extending out from a first end of the object 10 and parallel to each other. The standard piece 14 defines a standard hole 140. After that, the test piece 16 defines a test hole 160.

The base 20 includes a holding member 21 and two blocks 24. The holding member 21 includes a rectangular platform 22, an extension portion 26 perpendicularly extending up from a first end of the platform 22, and an installing portion 28 perpendicularly extending out from a top end of the extension portion 26 opposite to the platform 22 toward a second end of the platform 22 opposite to the first end. The installing portion 28 vertically defines an installing hole 280. The platform 22 defines a through hole 222 aligning with the installing hole 280, two threaded holes 220 at opposite sides of the positioning hole 222, a rectangular through slot 226 extending through a front side and a rear side of the platform 22 and adjacent to the second end, and a vertical round fixing hole 224 perpendicular to and communicating with the through slot 226. Each block 24 defines a depressed portion 240 in a top surface. The first and second ends of the platform 22 are respectively engaged in the depressed portions 240 of the blocks 24. Two screws 60 extend through the blocks 24 and engage in the platform 22 from bottom to top, thereby the platform 22 are fixed in the depressed portions 240 and are supported on the blocks 24.

The testing member 29 includes a pole 290 defining two annular grooves 295 respectively adjacent to a top end and a bottom end of the pole 290, two C-shaped engaging portions 292, and a spring 294 fitted about the pole 290. A columnar testing pin 296 extends down from the bottom end of the pole 290. The pole 290 extends through the installing hole 280 from top to bottom, until the bottom annular groove 295 extends out of the installing hole 280. The engaging portions 292 are then engaged in the annular grooves 295. The spring 294 is sandwiched between the top engaging portion 292 and the installing portion 28, thereby slidably mounting the testing member 29 to the installing portion 28. The diameter of the testing pin 296 is set to be equal to the standard diameter of the test hole 160 subtracting the coaxial tolerance of the test hole 160.

The fixing member 30 includes a clamping member 31, a fixing pole 36, a fastener 38, and a spring 39. The clamping member 31 includes a rectangular sliding bar 32 and a clamping arm 34 perpendicularly extending up from a rear end of the sliding bar 32. The clamping arm 34 has an arc-shaped front surface facing the sliding bar 32. A guiding portion 340 is formed on an upper portion of the front surface of the clamping arm 34, slantingly extending down from a top end of the clamping arm 34 toward the sliding bar 32. The sliding bar 32 longitudinally defines a slide slot 320 extending through a top and a bottom of the sliding bar 32 adjacent to the clamping arm 34. The clamping arm 34 defines a cutout 35 in the front surface adjacent to the sliding bar 32. The fastener 38 includes a head 380 and a bolt 382 perpendicularly extending out from a side of the head 380. The sliding bar 32 slidably extends through the through slot 226 and the spring 39 from rear to front. The bolt 382 is engaged in a front end of the sliding bar 32 opposite to the clamping arm 34. The spring 39 is sandwiched between the head 380 and the front side of the platform 22, thereby slidably fixing the clamping member 31 to the platform 22. The cutout 35 accommodates an upper portion of the rear side of the platform 22 above the through slot 226. The fixing pole 36 is firmly extended through the fixing hole 224 and is then slidably inserted into the slide slot 320. A rear side of the fixing pole 36 contacts the front surface of the clamping arm 34.

The positioning member 40 includes a U-shaped holder 41, a positioning pole 46, and a spring 48. The holder 41 includes a connection portion 42 defining a mounting hole 420 extending through a top and a bottom of the connection portion 42, and two fixing arms 44 perpendicularly extending up from opposite ends of the connection portion 42. An annular protrusion 460 protrudes out from a center of the positioning pole 46. The positioning pole 46 has a tapered top end slidably extending through the through hole 222 from bottom to top. A bottom end of the positioning pole 46 slidably extending through the spring 49 and the mounting hole 420. Two screws 70 extend through the fixing arms 44 and are then engaged in the threaded holes 220 of the platform 22 from bottom to top, to fix the positioning member 40 to the bottom of the platform 22. The spring 49 is sandwiched between the protrusion 460 and the connection portion 42.

Figure 3:
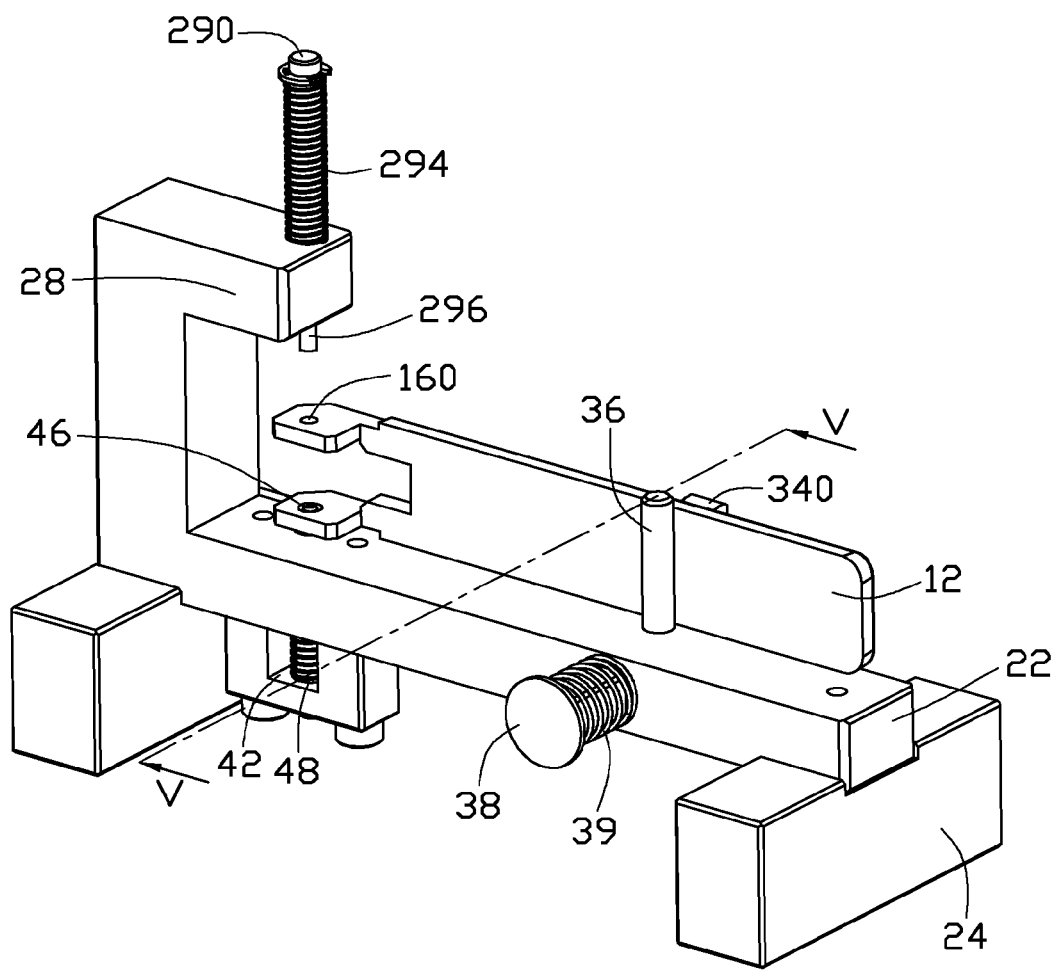
FIG. 3 is an assembled, isometric view of FIG. 2.
Figure 4:
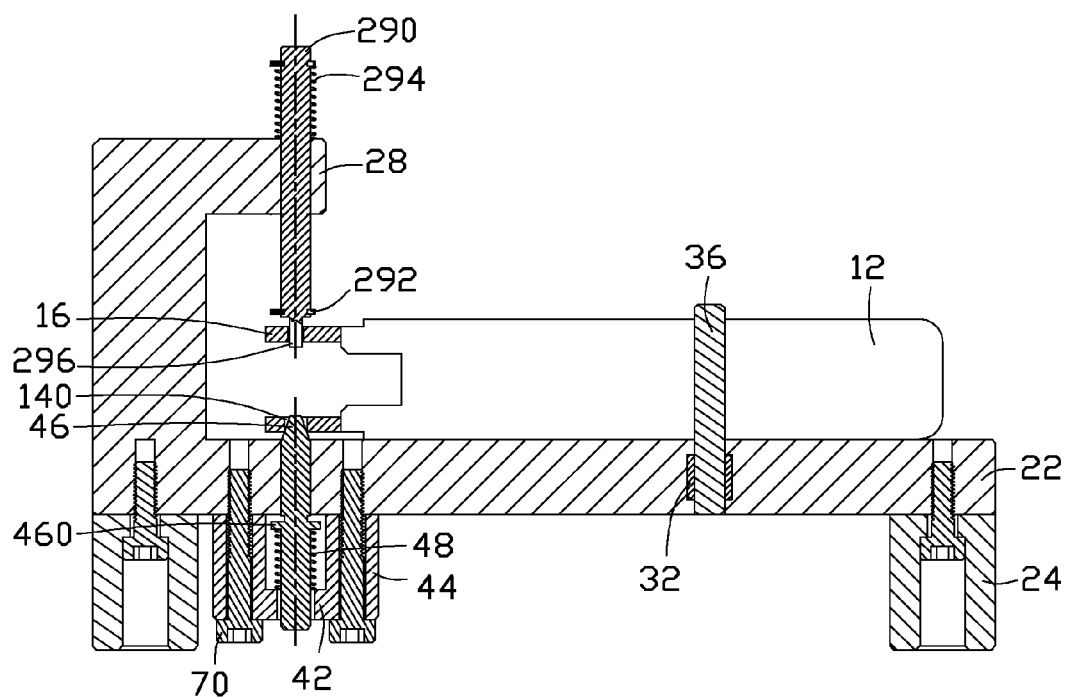
FIG. 4 is a schematic, cross-sectional view showing the test device of FIG. 3 in a using state.
Figure 5:
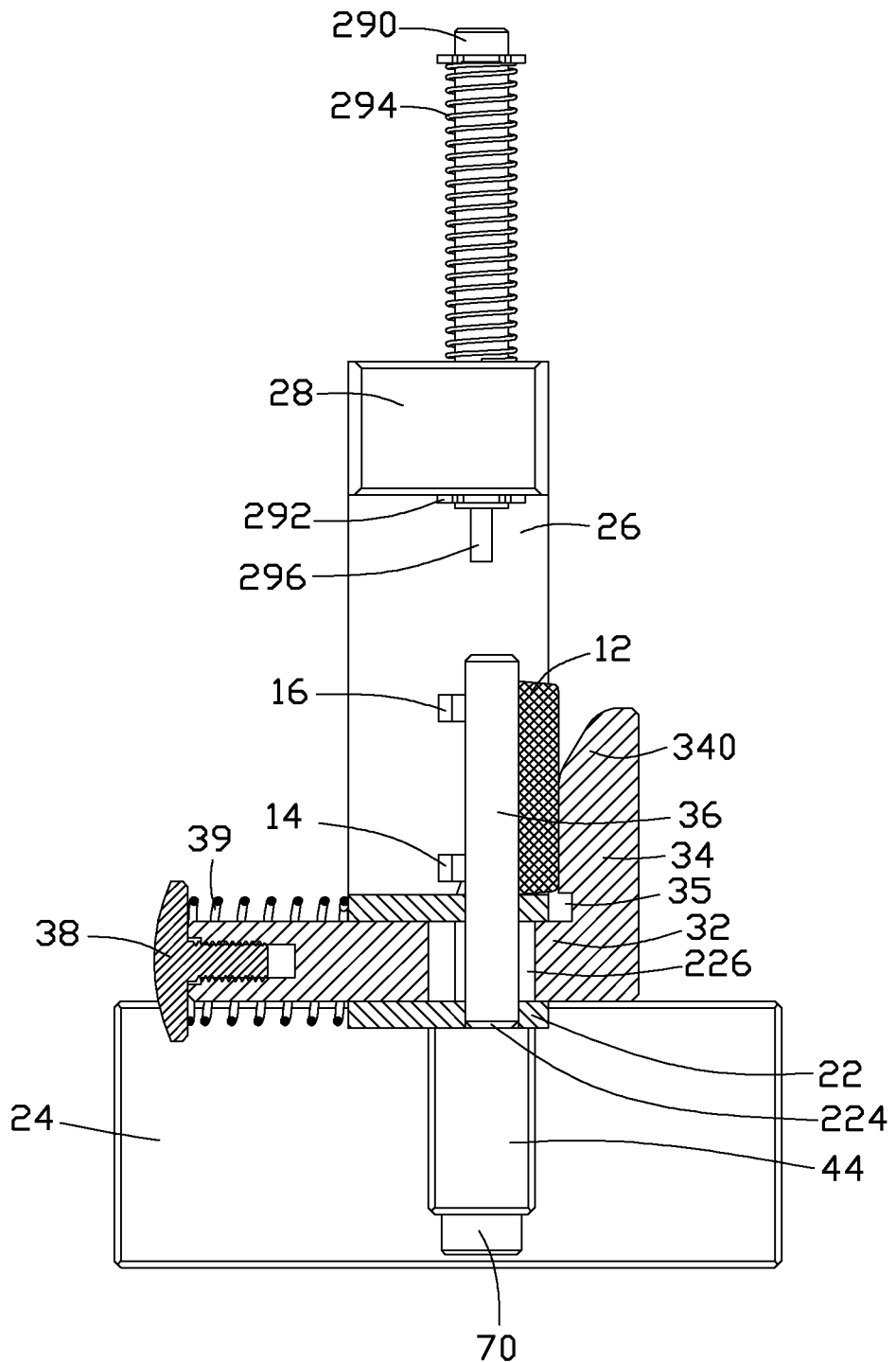
FIG. 5 is a cross-sectional view of FIG. 3, taken along the line V-V.

Referring to FIGS. 3 to 5, in use, the fastener 38 is pressed rearward to deform the spring 39 and push the clamping arm 34 away from the fixing pole 36. A second end of the main body 12 opposite to the standard piece 14 is then received between the fixing pole 36 and the clamping arm 34. The standard hole 140 is fitted about the positioning pole 222. The object 10 is moved down to be supported on the platform 22. An inner surface bounding the standard hole 140 presses the positioning pole 222 downward and deforms the spring 48. The fastener 38 is then released, and the spring 39 is restored. The clamping arm 34 is biased to move forward and sandwich the main body 12 together with the fixing pole 36 firmly.

The pole 290 is pressed downward, if the testing pin 296 is capable of being inserted into the test hole 160, the coaxial accuracy between the standard hole 140 and the test hole 160 of the object 10 is qualified. If the pole 290 cannot be inserted into the test hole 160, the coaxial accuracy between the standard hole 140 and the test hole 160 of the object 10 is unqualified.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. A test device for testing whether a coaxial accuracy between a test hole and a standard hole of an object is qualified or not, the object includes a main body, a standard piece defining the standard hole, and a test piece defining the test hole, the test device comprising:
a base to support the object;
a fixing member mounted to a first end of the base to fix the main body of the object;
a positioning member mounted to a bottom of the a second end of the base opposite to the fixing member, the positioning member comprising a positioning pole to be extended through the standard hole of the object with a top end; and
a testing member mounted to a top of the second end of the base opposite to the positioning member; the testing member comprising a testing pin aligning with the positioning pole and slidably relative to the positioning pole, a diameter of the testing pin equaling to a standard diameter of the test hole subtracting a positional tolerance of the test hole, wherein the testing pin is operable of being inserted into the test hole in response to the coaxial accuracy between the test hole and the standard hole being qualified and cannot be operable of being inserted into the test hole in response to the coaxial accuracy between the test hole and the standard hole being unqualified.

2. The test device of claim 1, wherein the base comprises a platform to support the object and an installing portion parallel to and above the platform, the testing member comprises a vertical pole slidably mounted to the installing portion in a direction from top to bottom, two engaging portions are respectively mounted to a top end and a bottom end of the pole, a first spring is fitted about the pole and sandwiched between the top engaging portion and the installing portion, the testing pin extends down from the bottom end of the pole.

3. The test device of claim 2, wherein the base further comprises an extension portion connected between the platform and the installing portion.

4. The test device of claim 1, wherein the base comprises a platform to support the object, the fixing member comprises a fixing pole and a clamping member, the fixing pole is fixed to an end of the platform away from the positioning member, the clamping member is slidably mounted to the platform to sandwich the main body of the object together with the fixing pole.

5. The test device of claim 4, wherein the platform defines a through slot extending through a front side and a rear side of the platform, the clamping member comprises a sliding bar sidably received in the through slot and a clamping arm extending up from the sliding bar, the fixing member further comprise a fastener engaged in a distal end of the sliding bar opposite to the clamping arm, a second spring is fitted about the sliding bar and is sandwiched between the fastener and the platform, the clamping arm sandwiches the main body together with the fixing pole.

6. The test device of claim 5, wherein the platform defines a vertical fixing hole perpendicular to and communicating with the through slot, the fixing pole is firmly engaged in the fixing hole and then is slidably inserted into the through slot.

7. The test device of claim 6, wherein a guiding portion slantingly extending down from a top of the clamping arm toward the sliding bar.

8. The test device of claim 6, wherein the clamping arm comprises an arc-shaped front surface facing and detachably contacting the fixing pole.

9. The test device of claim 8, wherein the clamping arm abuts the rear side of the platform and defines a cutout to accommodate an upper portion of the rear side of the platform above the through slot.

10. The test device of claim 5, wherein the fastener comprises a head abutting an end of the second spring and a bolt extending from the head and engaged in the sliding bar.

11. The test device of claim 1, wherein the base comprises a platform to support the object, the positioning member comprises a holder comprising a connection portion and two fixing arm extending up from opposite ends of the connection portion, a protrusion protrudes out from a circumference of the positioning pole, a top end of the positioning pole is slidably extended through the standard hole of the object; a bottom end of the positioning pole opposite to the top end is slidably extended through the connection portion, a third spring is fitted abut the positioning pole and is sandwiched between the protrusion and the connection portion.

12. The test device of claim 1, wherein the top end of the positioning pole is tapered.

13. The test device of claim 1, further comprising two blocks each defining a depressed portion in a top surface, wherein the base comprises a platform to support the object, opposite ends of the platform are received in the depressed portions.

* * * * *